(12) United States Patent
Tsuchiya

(10) Patent No.: US 11,137,022 B2
(45) Date of Patent: Oct. 5, 2021

(54) PIVOT ASSEMBLY BEARING APPARATUS

(71) Applicant: MINEBEA MITSUMI Inc., Nagano (JP)

(72) Inventor: Kunihiro Tsuchiya, Tomioka (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/987,615

(22) Filed: Aug. 7, 2020

(65) Prior Publication Data

US 2021/0040985 A1 Feb. 11, 2021

(30) Foreign Application Priority Data

Aug. 8, 2019 (JP) .............................. JP2019-146249

(51) Int. Cl.
| | |
|---|---|
| *F16C 19/18* | (2006.01) |
| *F16C 33/58* | (2006.01) |
| *F16C 35/077* | (2006.01) |
| *F16C 35/06* | (2006.01) |
| *G11B 5/48* | (2006.01) |

(52) U.S. Cl.
CPC ............ *F16C 19/18* (2013.01); *F16C 33/583* (2013.01); *F16C 35/061* (2013.01); *F16C 35/077* (2013.01); *F16C 2370/12* (2013.01); *G11B 5/4813* (2013.01)

(58) Field of Classification Search
CPC ........ F16C 19/18; F16C 19/54; F16C 33/583; F16C 35/061; F16C 35/07; F16C 35/077; F16C 2262/62; F16C 2370/12; G11B 5/4813

USPC .............. 384/446, 477, 504, 513, 517, 536; 360/265.2, 265.4, 265.6

See application file for complete search history.

(56) References Cited

U.S. PATENT DOCUMENTS

| | | | | |
|---|---|---|---|---|
| 3,672,734 | A * | 6/1972 | Bando ................... | F16C 27/066 384/536 |
| 5,801,902 | A * | 9/1998 | Koeppel ................. | F16C 19/54 310/67 R |
| 5,839,349 | A * | 11/1998 | Volz ....................... | B60T 8/4022 92/147 |
| 6,678,122 | B2 * | 1/2004 | Koyama ............... | F16C 35/077 360/265.6 |

(Continued)

FOREIGN PATENT DOCUMENTS

| | | | | |
|---|---|---|---|---|
| CN | 210739159 U | * | 6/2020 | ............ F16C 35/063 |
| JP | 2002-115725 A | | 4/2002 | |
| JP | 2006329414 A | * | 12/2006 | .............. F16C 33/56 |

*Primary Examiner* — Marcus Charles
(74) *Attorney, Agent, or Firm* — Pearne & Gordon LLP

(57) ABSTRACT

A pivot assembly bearing apparatus includes: a shaft extending in an axial direction, a first rolling bearing, a second rolling bearing and a first sleeve bonded to an outer peripheral surface of the first outer ring of the first rolling bearing, a second sleeve bonded to an outer peripheral surface of the second outer ring of the second rolling bearing and a spacer abutting on a lower end surface of the first outer ring and an upper end surface of the second outer ring. A part of the first sleeve protruding downwards in the axial direction from the first outer ring is bonded to the spacer, and a part of the second sleeve protruding upwards in the axial direction from the second outer ring is bonded to the spacer.

9 Claims, 4 Drawing Sheets

(56) References Cited

U.S. PATENT DOCUMENTS

| | | | | |
|---|---|---|---|---|
| 6,709,162 | B2* | 3/2004 | Muraki | F16C 35/06 |
| | | | | 384/504 |
| 7,952,837 | B1* | 5/2011 | Dobosz | G11B 5/4813 |
| | | | | 360/265.4 |
| 8,947,832 | B2* | 2/2015 | Tsuchiya | F16C 25/06 |
| | | | | 360/265.2 |
| 10,192,575 | B1* | 1/2019 | Resh | G11B 21/02 |
| 2002/0041471 | A1 | 4/2002 | Koyama | |
| 2002/0085780 | A1* | 7/2002 | Muraki | F16C 35/06 |
| | | | | 384/517 |
| 2016/0118068 | A1* | 4/2016 | Kaneko | G11B 25/043 |
| | | | | 360/265.6 |
| 2016/0365105 | A1* | 12/2016 | Kimura | F16F 15/08 |
| 2017/0051833 | A1* | 2/2017 | Sato | F16C 33/762 |
| 2019/0287557 | A1* | 9/2019 | Akatsuka | G11B 5/4813 |

* cited by examiner

PIVOT ASSEMBLY BEARING APPARATUS

CROSS REFERENCE TO RELATED APPLICATIONS

This application claims the benefit of Japanese Patent Application No. 2019-146249, filed on Aug. 8 2019, which is hereby incorporated by reference in its entirety.

BACKGROUND

Technical Field

The present disclosure relates to a pivot assembly bearing apparatus.

Background

A pivot assembly bearing apparatus is used for swingably supporting a head actuator of a hard disk drive apparatus. The pivot assembly bearing apparatus includes, for example, a cylindrical sleeve, a cylindrical shaft disposed on an inner periphery side of the sleeve, and two rolling bearings disposed between the sleeve and the shaft to rotatably support the sleeve with respect to the shaft. The rolling bearings are disposed separately from each other in an axial direction of the shaft and are bonded to the shaft and the sleeve, respectively. The pivot assembly bearing apparatus is inserted into a cylindrical portion of the head actuator and is fixed into the cylindrical portion by a set screw (for example, see Japanese Patent Application Laid-Open No. 2002-115725).

However, in the hard disk drive apparatus of the related art, it has been desired to increase the capacity and improvement in responsiveness of the head actuator of the hard disk drive apparatus is demanded with the increase in the capacity of a hard disk. Here, when deformation of the rolling bearings due to deformation of the sleeve to be caused by the set screw can be further prevented, the responsiveness of the head actuator can be further improved.

The present disclosure is related to providing a pivot assembly bearing apparatus capable of further improving responsiveness of a head actuator.

SUMMARY

According to a first aspect of the present disclosure, a pivot assembly bearing apparatus to be fixed to a head actuator by a set screw includes: a shaft extending in an axial direction; and a first rolling bearing bonded to an upper side that is one side in the axial direction of the shaft and including a first outer ring, a first inner ring disposed on an inner periphery side of the first outer ring, and a first rolling element disposed between the first outer ring and the first inner ring. In addition, the pivot assembly bearing apparatus includes a second rolling bearing bonded to a lower side, which is another side in the axial direction of the shaft, separately from the first rolling bearing and including a second outer ring, a second inner ring disposed on an inner periphery side of the second outer ring, and a second rolling element disposed between the second outer ring and the second inner ring. Further, the pivot assembly bearing apparatus includes a first sleeve bonded to an outer peripheral surface of the first outer ring and extending in the axial direction, a second sleeve bonded to an outer peripheral surface of the second outer ring and extending in the axial direction, and a spacer abutting on a lower end surface of the first outer ring and an upper end surface of the second outer ring. A part of the first sleeve protruding downwards in the axial direction from the first outer ring is bonded to the spacer, and a part of the second sleeve protruding upwards in the axial direction from the second outer ring is bonded to the spacer.

According to the pivot assembly bearing apparatus of the present disclosure, it is possible to further improve responsiveness of the head actuator.

BRIEF DESCRIPTION OF THE DRAWINGS

FIG. 4A shows a test result of the pivot assembly bearing apparatus according to the embodiment of the present disclosure, and FIG. 4B shows a test result of a pivot assembly bearing apparatus of a comparative example.

DETAILED DESCRIPTION

Hereinafter, an embodiment of the present disclosure will be described with reference to the accompanying drawings. In the present disclosure, a direction parallel to a rotation axis of a bearing apparatus is referred to as "axial direction", and a direction orthogonal to the rotation axis of the bearing apparatus is referred to as "radial direction". In the present disclosure, a shape and a positional relation of respective component will be described with one side in the axial direction as an upper direction and another side in the axial direction as a lower direction. However, the definition of the upper-lower direction is not intended to limit an orientation of the bearing apparatus according to the present disclosure during manufacturing and during use.

Figure 1:
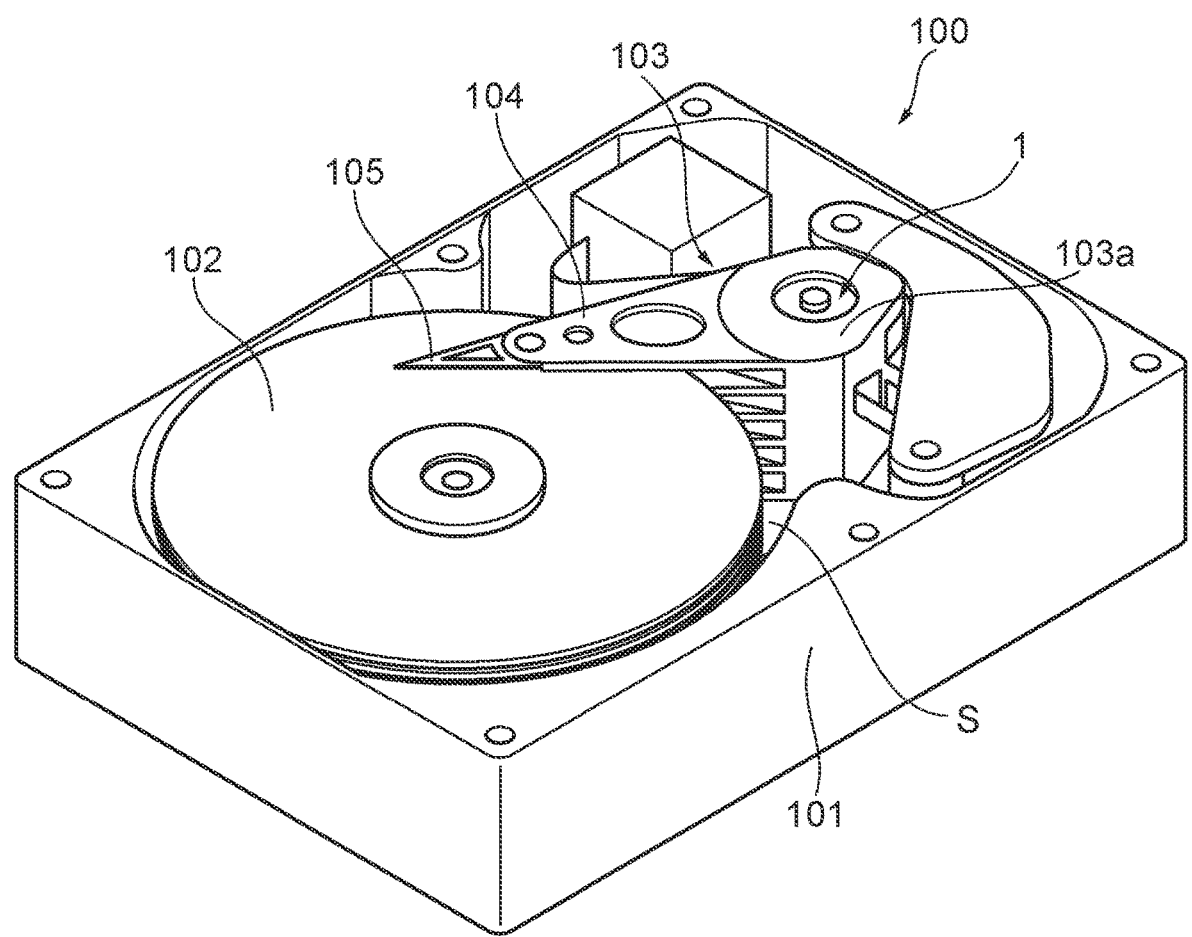
FIG. 1 is a perspective view showing a configuration of a hard disk drive apparatus including a pivot assembly bearing apparatus according to an embodiment of the present disclosure.
Figure 2:
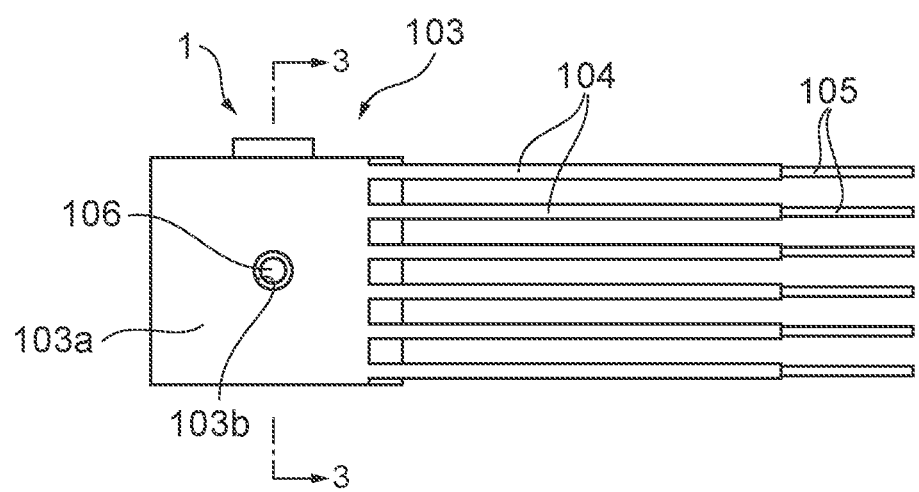
FIG. 2 is a side view showing a configuration of a head actuator of the hard disk drive apparatus shown in FIG. 1.

FIG. 1 is a perspective view showing a schematic configuration of a hard disk drive apparatus 100 including a pivot assembly bearing apparatus 1 according to an embodiment of the present disclosure, and FIG. 2 is a side view showing a configuration of a head actuator 103 of the hard disk drive apparatus 100 shown in FIG. 1.

As shown in FIG. 1, the hard disk drive apparatus 100 is formed of a fixed portion including a housing 101 and a rotating portion to which a magnetic disk 102 is fixed, and rotatably supports the magnetic disk 102. A casing of the hard disk drive apparatus 100 is formed of a cover (not shown) and the housing 101. An internal space S formed by the cover and the housing 101 is filled with air or a gas (for example, helium, nitrogen, or a mixture gas of helium and nitrogen) having a lower density than the air.

In the hard disk drive apparatus 100, a magnetic head 105 disposed at a tip of a swing arm 104 of the head actuator 103 swingably supported by the pivot assembly bearing apparatus 1 moves above the rotating magnetic disk 102. Thus, information is recorded on the magnetic disk 102, and the information recorded on the magnetic disk 102 is readable.

The head actuator 103 is formed with a cylindrical portion 103a into which the pivot assembly bearing apparatus 1 is inserted. In addition, as shown in FIG. 2, the head actuator 103 is formed with a screw hole 103b that penetrates the cylindrical portion 103a. A set screw 106 is screwed into the screw hole 103b, and the pivot assembly bearing apparatus 1 is fixed into the cylindrical portion 103a by the set screw 106.

Figure 3:
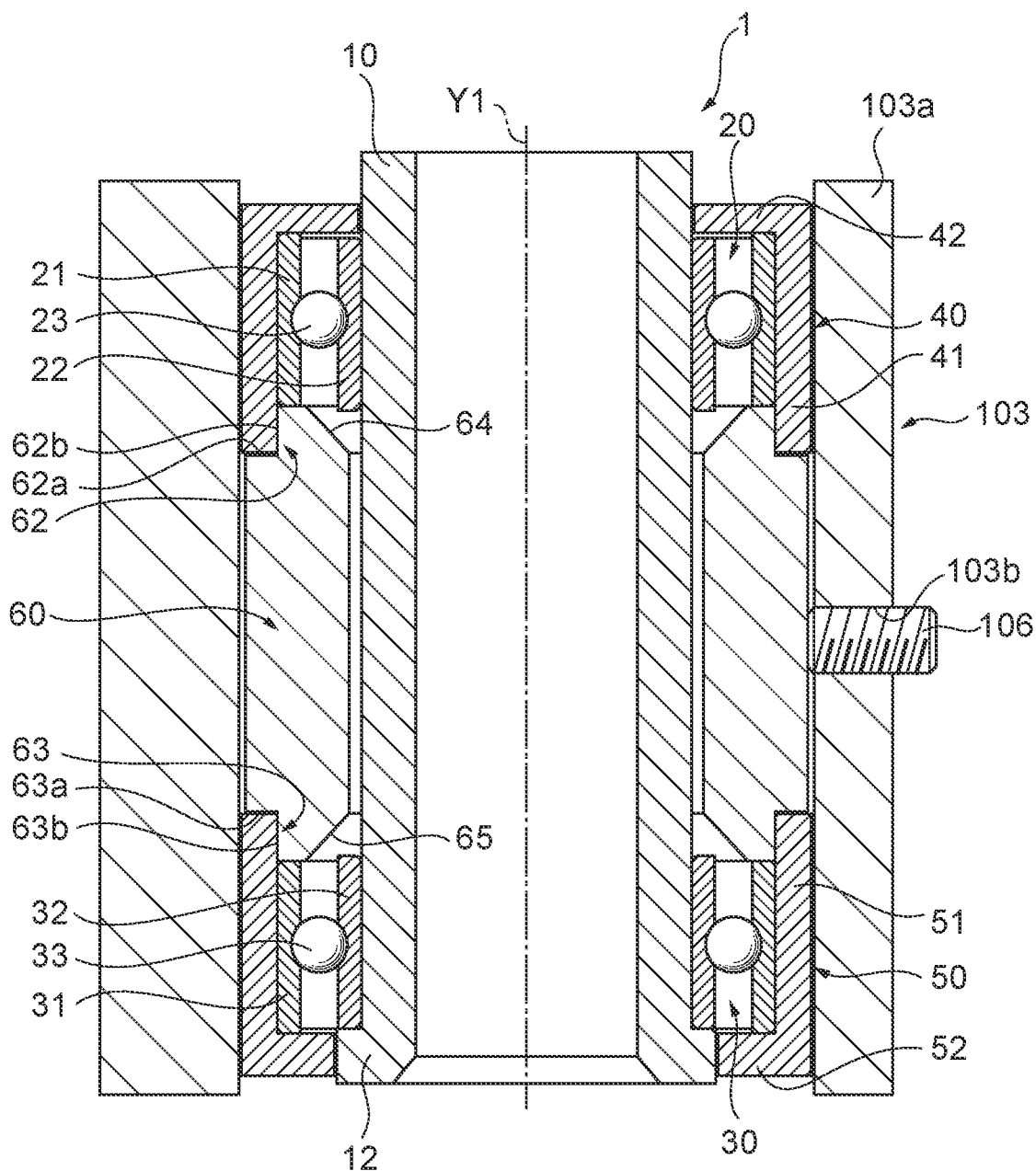
FIG. 3 is a cross-sectional view taken along a line 3-3 in FIG. 2 to show a configuration of the pivot assembly bearing apparatus.

FIG. 3 is a cross-sectional view taken along a line A-A in FIG. 2 to show a configuration of the pivot assembly bearing apparatus 1. The pivot assembly bearing apparatus 1 according to the embodiment of the present disclosure includes a shaft 10 extending in the axial direction (rotation axis; Y1 direction) and a first rolling bearing 20 provided on an upper side in the axial direction (an upper side in FIG. 3) of the shaft 10 and including a first outer ring 21, a first inner ring 22 disposed on an inner periphery side of the first outer ring 21, and a first rolling element 23 disposed between the first outer ring 21 and the first inner ring 22. In addition, the pivot assembly bearing apparatus 1 includes a second rolling bearing 30 provided on a lower side in the axial direction (a lower side in FIG. 3) of the shaft 10 separately from the first rolling bearing 20 and including a second outer ring 31, a second inner ring 32 disposed on an inner periphery side of the second outer ring 31, and a second rolling element 33 disposed between the second outer ring 31 and the second inner ring 32.

Further, the pivot assembly bearing apparatus 1 includes a first sleeve 40 bonded to an outer peripheral surface of the first outer ring 21 and extending in the axial direction, a second sleeve 50 bonded to an outer peripheral surface of the second outer ring 31 and extending in the axial direction, and a spacer 60 that abuts on a lower end surface of the first outer ring 21 and an upper end surface of the second outer ring 31. A part of the first sleeve 40 protruding downwards in the axial direction from the first outer ring 21 is bonded to the spacer 60, and a part of the second sleeve 50 protruding upwards in the axial direction from the second outer ring 31 is bonded to the spacer 60. Hereinafter, a configuration of the pivot assembly bearing apparatus 1 will be described in detail.

In the pivot assembly bearing apparatus 1, the shaft 10 is a cylindrical member extending in parallel with the axial direction as shown in FIG. 3. In the shaft 10, a flange portion 12 having an annular shape is provided to protrude from an end portion (hereinafter, also referred to as a lower end portion) on a lower side (a lower side in FIG. 3) in the axial direction of the shaft 10 to an outer side (hereinafter, also referred to as an outer periphery side) in a radial direction orthogonal to the rotation axis Y1. The flange portion 12 is disposed coaxially with the shaft 10 and has the rotation axis Y1 as a central axis. The flange portion 12 is formed integrally with the shaft 10. The shaft 10 is formed of, for example, austenitic stainless steel (SUS300 series).

The pivot assembly bearing apparatus 1 includes two rolling bearings on the outer peripheral surface of the shaft 10. The pivot assembly bearing apparatus 1 includes the first rolling bearing 20 located on the upper side in the axial direction (the upper side in FIG. 3) and the second rolling bearing 30 located on the lower side in the axial direction and separated apart from the first rolling bearing 20. The first rolling bearing 20 and the second rolling bearing 30 are coaxially disposed and have the rotation axis Y1 as a central axis. The first rolling bearing 20 and the second rolling bearing 30 are, for example, the same type of ball bearings. The pivot assembly bearing apparatus 1 may include at least any one of rolling bearings. In addition, the first rolling bearing 20 and the second rolling bearing 30 may be bearings other than the ball bearings, or may be different types of bearings.

The first rolling bearing 20 includes the first outer ring 21 having an annular shape, the first inner ring 22 having an annular shape and disposed on the inner side (hereinafter, also referred to as an inner periphery side) in the radial direction of the first outer ring 21, and the first rolling element 23 that is rotatably disposed between the first outer ring 21 and the first inner ring 22. The first rolling bearing 20 is loosely fitted in the shaft 10, and is fixed to the shaft 10 by a bonding layer (not shown) existing between the inner peripheral surface of the first inner ring 22 and the outer peripheral surface of the shaft 10. A preload is applied to the first rolling bearing 20. The first outer ring 21 and the first inner ring 22 are formed of, for example, martensitic stainless steel (SUS400 series).

The second rolling bearing 30 includes the second outer ring 31 having an annular shape, the second inner ring 32 having an annular shape and disposed on the inner periphery side of the second outer ring 31, and the second rolling element 33 that is rotatably disposed between the second outer ring 31 and the second inner ring 32. The second rolling bearing 30 is loosely fitted in the shaft 10, and is fixed to the shaft 10 by a bonding layer (not shown) existing between the inner peripheral surface of the second inner ring 32 and the outer peripheral surface of the shaft 10.

An end surface on a lower side (hereinafter, also referred to as a lower end surface) in the axial direction of the second inner ring 32 abuts on an end surface on an upper side (hereinafter, also referred to as an upper end surface) in the axial direction of the flange portion 12 of the shaft 10. A preload is applied to the second rolling bearing 30. The second outer ring 31 and the second inner ring 32 is formed of, for example, martensitic stainless steel (SUS400 series).

The first sleeve 40 includes a first cylindrical portion 41 that is a cylindrical portion extending in parallel with the axial direction and a first inward flange portion 42 having an annular shape that extends from an end portion on an upper side (hereinafter, also referred to as an upper end portion) in the axial direction of the first cylindrical portion 41 toward an inner periphery side to cover a gap between the first outer ring 21 and the first inner ring 22. The first cylindrical portion 41 and the first inward flange portion 42 are coaxially disposed and have the rotation axis Y1 as a central axis. The first cylindrical portion 41 and the first inward flange portion 42 are integrally formed. The first sleeve 40 is formed of, for example, austenitic stainless steel (SUS300 series) or martensitic stainless steel (SUS400 series).

The first sleeve 40 is loosely fitted in the first rolling bearing 20, and is fixed to the first rolling bearing 20 by a bonding layer (not shown) existing the inner peripheral surface of the first cylindrical portion 41 and the outer peripheral surface of the first outer ring 21.

A diameter of the outer peripheral surface of the first cylindrical portion 41 is slightly smaller than a diameter of the inner peripheral surface of the cylindrical portion 103a of the head actuator 103. The outer peripheral surface of the first cylindrical portion 41 is disposed so as to be separated from the inner peripheral surface of the cylindrical portion 103a with a predetermined gap.

The lower end surface of the first inward flange portion 42 abuts on the upper end surface of the first outer ring 21 of the first rolling bearing 20. On the other hand, the lower end surface of the first inward flange portion 42 does not abut on the upper end surface of the first inner ring 22 of the first rolling bearing 20, and is disposed so as to be separated from the upper end surface of the first inner ring 22 with a predetermined gap. A diameter of an end surface on the inner periphery side (hereinafter, also referred to as an inner peripheral end surface) of the first inward flange portion 42 is slightly larger than a diameter of the outer peripheral surface of the shaft 10. The inner peripheral end surface of the first inward flange portion 42 is disposed so as to be separated from the outer peripheral surface of the shaft 10 with a predetermined gap.

An axial length of the first cylindrical portion 41 is longer than an axial length of the first outer ring 21, and the first cylindrical portion 41 is formed so as to protrude downwards in the axial direction from the first outer ring 21.

The second sleeve 50 includes a second cylindrical portion 51 that is a cylindrical portion extending in parallel with the axial direction and a second inward flange portion 52 having an annular shape that extends from a lower end portion in the axial direction of the second cylindrical portion 51 toward an inner periphery side to cover a gap between the second outer ring 31 and the second inner ring 32. The second cylindrical portion 51 and the second inward flange portion 52 are coaxially disposed and have the rotation axis Y1 as a central axis. The second cylindrical portion 51 and the second inward flange portion 52 are integrally formed. The second sleeve 50 is formed of, for example, austenitic stainless steel (SUS300 series) or martensitic stainless steel (SUS400 series).

The second sleeve 50 is loosely fitted in the second rolling bearing 30, and is fixed to the second rolling bearing 30 by a bonding layer (not shown) existing between the inner peripheral surface of the second cylindrical portion 51 and the outer peripheral surface of the second outer ring 31.

A diameter of the outer peripheral surface of the second cylindrical portion 51 is slightly smaller than a diameter of the inner peripheral surface of the cylindrical portion 103a of the head actuator 103. The outer peripheral surface of the second cylindrical portion 51 is disposed so as to be separated from the inner peripheral surface of the cylindrical portion 103a with a predetermined gap.

The upper end surface of the second inward flange portion 52 abuts on the lower end surface of the second outer ring 31. A diameter of the inner peripheral surface of the second inward flange portion 52 is slightly larger than a diameter of an end surface (hereinafter, also referred to as an outer peripheral end surface) on the outer periphery side in the radial direction of the flange portion 12 of the shaft 10. In other words, the inner peripheral end surface of the second inward flange portion 52 is disposed so as to be separated from the outer peripheral end surface of the flange portion 12 with a predetermined gap.

An axial length of the second cylindrical portion 51 is longer than an axial length of the second outer ring 31, and the second cylindrical portion 51 is formed so as to protrude upwards in the axial direction from the second outer ring 31.

The spacer 60 abuts on the lower end surface of the first outer ring 21 and the upper end surface of the second outer ring 31. The spacer 60 is a cylindrical member extending in parallel with the axial direction, and includes a first step portion 62 recessed downwards in the axial direction from the upper end surface of the spacer 60 and a second step portion 63 recessed upwards in the axial direction from the lower end surface of the spacer 60. In addition, the spacer 60 includes a first inclined surface 64 having an annular shape of which diameter is further reduced as progresses downwards in the axial direction from an end on the inner periphery side of the upper end surface and a second inclined surface 65 having an annular shape of which diameter is further reduced as progresses upwards in the axial direction from an end on the inner periphery side of the lower end surface.

The spacer 60 has the rotation axis Y1 as a central axis. The diameter of the inner peripheral surface of the spacer 60 is slightly larger than the diameter of the outer peripheral surface of the shaft 10. Accordingly, the inner peripheral surface of the spacer 60 is disposed so as to be separated from the outer peripheral surface of the shaft 10 with a predetermined gap.

The diameter of the outer peripheral surface of the spacer 60 is slightly smaller than the diameter of the inner peripheral surface of the cylindrical portion 103a of the head actuator 103. Accordingly, the outer peripheral surface of the spacer 60 is disposed so as to be separated from the inner peripheral surfaces of the cylindrical portion 103a with a predetermined gap. The upper end surface of the spacer 60 abuts on the lower end surface of the first outer ring 21, and the lower end surface of the spacer 60 abuts on the upper end surface of the second outer ring 31. The spacer 60 is formed of, for example, austenitic stainless steel (SUS300 series) or martensitic stainless steel (SUS400 series). The spacer 60 may be formed of a material different from that of the first sleeve 40 and the second sleeve 50, or may be formed of a metal having a higher hardness than the first sleeve 40 and the second sleeve 50.

The first step portion 62 includes a first stepped surface 62a that is an annular surface provided downwards in the axial direction from the upper end surface of the spacer 60 and extending in the radial direction around the rotation axis Y1. The first stepped surface 62a is a surface that defines a boundary on the lower side in the axial direction of the first step portion 62. The first stepped surface 62a is connected to the outer peripheral surface of the spacer 60 at an outer peripheral edge of first stepped surface 62a. In addition, the first step portion 62 includes a first outer peripheral surface 62b between the upper end surface of the first spacer 60 and the first stepped surface 62a. The first outer peripheral surface 62b is a surface that defines a boundary on the outer periphery side of the first step portion 62. The first outer peripheral surface 62b is a cylindrical surface having the rotation axis Y1 extending upwards in the axial direction from an inner periphery edge of the first stepped surface 62a.

The first sleeve 40 is bonded to the first step portion 62. More specifically, a diameter of the first outer peripheral surface 62b of the first step portion 62 is substantially similar to a diameter of the inner peripheral surface of the first cylindrical portion 41 of the first sleeve 40. The first outer peripheral surface 62b is fixed to a part, which protrudes downwards in the axial direction from the first outer ring 21 of the first rolling bearing 20, of the inner peripheral surface of the first cylindrical portion 41 by a bonding layer (not shown).

The first stepped surface 62a does not abut on the lower end surface of the first cylindrical portion 41 of the first sleeve 40, and a predetermined gap is provided between the first stepped surface 62a and the lower end surface of the first cylindrical portion 41. The first stepped surface 62a may abut on the lower end surface of the first cylindrical portion 41.

The second step portion 63 includes a second stepped surface 63a that is an annular surface provided upwards in the axial direction from the lower end surface of the spacer 60 and extending in the radial direction around the rotation axis Y1. The second stepped surface 63a is a surface that defines a boundary on the upper side in the axial direction of the second step portion 63. The second stepped surface 63a is connected to the outer peripheral surface of the spacer 60 at an outer periphery edge of the second stepped surface 63a. In addition, the second step portion 63 includes a second outer peripheral surface 63b between the lower end surface of the spacer 60 and the second stepped surface 63a. The second outer peripheral surface 63b is a surface that defines a boundary on the outer periphery side of the second step portion 63. The second outer peripheral surface 63b is a cylindrical surface having the rotation axis Y1 extending upwards in the axial direction from an inner periphery edge of the second stepped surface 63a.

The second sleeve 50 is bonded to the second step portion 63. More specifically, a diameter of the second outer peripheral surface 63b of the second step portion 63 is substantially similar to a diameter of the inner peripheral surface of the second cylindrical portion 51 of the second sleeve 50. The second outer peripheral surface 63b is fixed to a part, which protrudes upwards in the axial direction from the second outer ring 31 of the second rolling bearing 30, of the inner peripheral surface of the second cylindrical portion 51 by a bonding layer (not shown).

The second stepped surface 63a does not abut on the upper end surface of the second cylindrical portion 51 of the second sleeve 50, and a predetermined gap is provided between the second stepped surface 63a and the upper end surface of the second cylindrical portion 51. The second stepped surface 63a may abut on the upper end surface of the second cylindrical portion 51.

The first inclined surface 64 extends so as to further reduce in diameter as progresses downwards in the axial direction from the inner periphery edge of the upper end surface of the spacer 60. A lower edge in the axial direction of the first inclined surface 64 is connected to an upper end in the axial direction of the inner peripheral surface of the spacer 60. The first inclined surface 64 does not abut on the lower end surface of the first inner ring 22 of the first rolling bearing 20, and a predetermined gap is provided between the first inclined surface 64 and the lower end surface of the first inner ring 22.

The second inclined surface 65 extends so as to further reduce in diameter as progresses upwards in the axial direction from the inner periphery edge of the lower end surface of the spacer 60. An upper edge in the axial direction of the second inclined surface 65 is connected to a lower end in the axial direction of the inner peripheral surface of the spacer 60. The second inclined surface 65 does not abut on the upper end surface of the second inner ring 32 of the second rolling bearing 30, and a predetermined gap is provided between the second inclined surface 65 and the upper end surface of the second inner ring 32.

The pivot assembly bearing apparatus 1 is inserted into the cylindrical portion 103a of the head actuator 103, and the set screw 106 is screwed into the screw hole 103b of the head actuator 103. The spacer 60 of the pivot assembly bearing apparatus 1 is pressed by the tip of the set screw 106, thereby being non-rotatably fixed to the head actuator 103.

Subsequently, a test for measuring a rotational torque of the pivot assembly bearing apparatus 1 will be described. Samples were prepared in which the pivot assembly bearing apparatus 1 was pressed by the tip of the set screw 106 and the set screw 106 was tightened to the pivot assembly bearing apparatus 1 with tightening torques of 0.05 kgf·cm, 2 kgf·cm, and 3 kgf·cm. The tightening torque is a value adjusted with a torque wrench. A rotational torque was measured when the pivot assembly bearing apparatus 1 inserted into the cylindrical portion 103a was rotated 360 degrees at a rotational speed of 2 rpm to confirm an increase rate of an average rotational torque of the sample having the tightening torque of 2 kgf·cm with respect to an average rotational torque of the sample having the tightening torque of 0.05 kgf·cm and an increase rate of an average rotational torque of the sample having the tightening torque of 3 kgf·cm with respect to an average rotational torque of the sample having the tightening torque of 0.05 kgf·cm.

As a comparative example, a pivot assembly bearing apparatus was used in which the first sleeve 40, the second sleeve 50, and the spacer 60 were not separately formed and an existing sleeve not including the first inward flange portion 42 and the second inward flange portion 52 was provided.

Figure 4A:
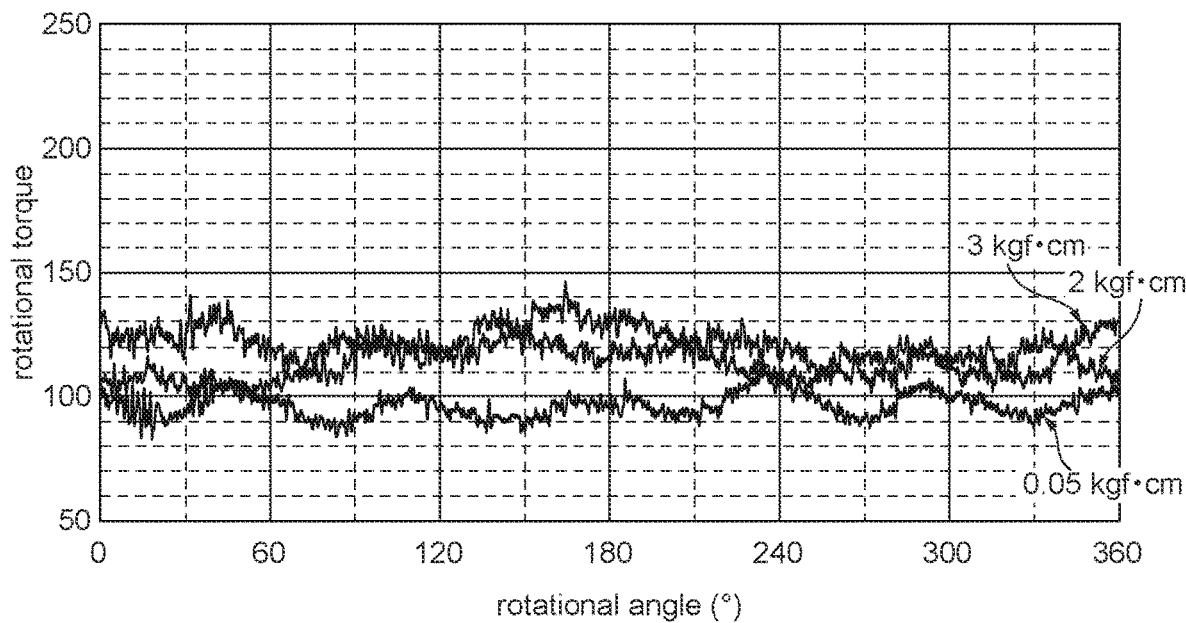
FIGS. 4A and 4B are graphs showing results of a rotational torque measurement test, respectively.
Figure 4B:
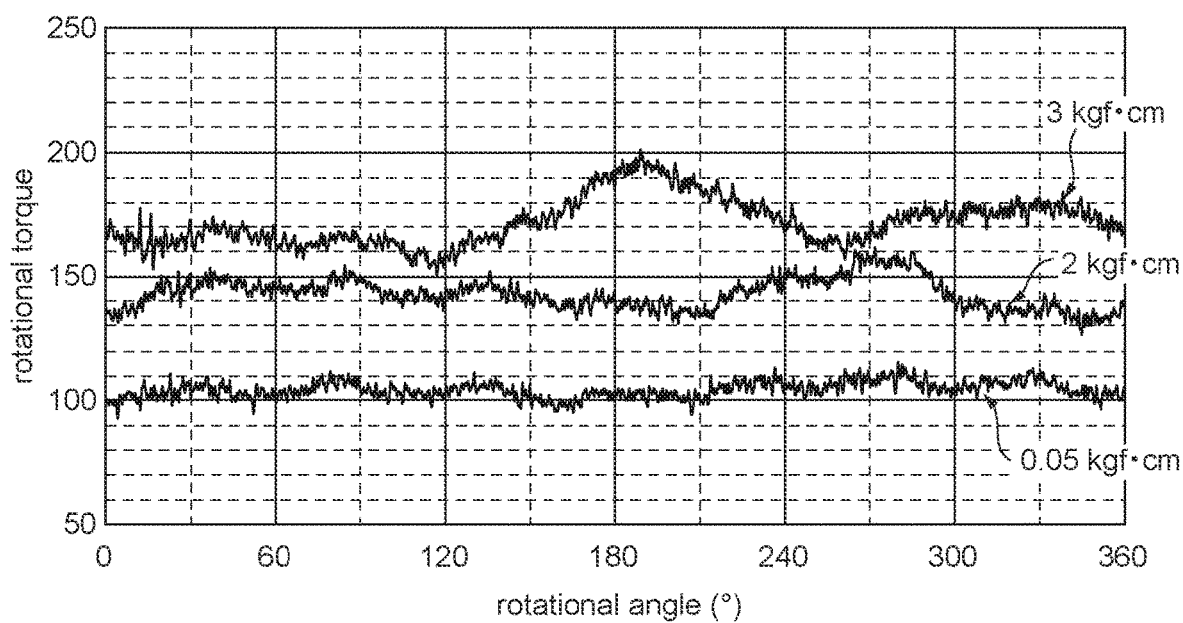

FIGS. 4A and 4B are graphs showing results of the rotational torque measurement test, respectively; FIG. 4A shows a test result of the pivot assembly bearing apparatus 1 and FIG. 4B shows a test result of the pivot assembly bearing apparatus of the comparative example. A horizontal axis indicates a rotational angle, and a vertical axis indicates a rotational torque. For the sake of convenience, the rotational torque is indicated as a relative value when the rotational torque is 100 at a rotational angle of 0 degree of the sample having the set screw tightening torque of 0.05 kgf·cm. Specifically, the increase rate of the average rotational torque of the sample having the tightening torque of 2 kgf·cm is 120% with respect to the average rotational torque of the sample of the pivot assembly bearing apparatus 1 having the tightening torque of 0.05 kgf·cm, and the increase rate of the average rotational torque of the sample having the tightening torque of 3 kgf·cm is 125% with respect to the average rotational torque of the sample having the tightening torque of 0.05 kgf·cm. On the other hand, the increase rate of the average rotational torque of the sample having the tightening torque of 2 kgf·cm is 137% with respect to the average rotational torque of the sample of the pivot assembly bearing apparatus of the comparative example having the tightening torque of 0.05 kgf·cm, and the increase rate of the average rotational torque of the sample having the tightening torque of 3 kgf·cm is 165% with respect to the average rotational torque of the sample having the tightening torque of 0.05 kgf·cm.

As described above, it is understood that the increase rate of the average rotational torque of the pivot assembly bearing apparatus 1 when the set screw tightening torque is increased is lower than the increase rate of the average rotational torque of the pivot assembly bearing apparatus of the comparative example. Since the pivot assembly bearing apparatus 1 is configured in which the first sleeve 40, the second sleeve 50, and the spacer 60 are separately formed, the deformation of the spacer 60 caused by being pressed by the tip of the set screw 106 can be prevented from being transmitted to the first sleeve 40 and the second sleeve 50, and thus the deformation of the first sleeve 40 and the second sleeve 50 can be prevented. Accordingly, the pivot assembly bearing apparatus 1 can prevent the deformation of the first rolling bearing 20 and the second rolling bearing 30. Further, the spacer 60 of the pivot assembly bearing apparatus 1 can increase a thickness in the radial direction of the part to be pressed by the set screw 106. Thereby, rigidity of the spacer 60 can be increased, and the deformation of the spacer 60 to be transmitted to the first sleeve 40 and the second sleeve 50 can be further prevented. Therefore, the pivot assembly bearing apparatus 1 can further prevent the deformation of the first rolling bearing 20 and the second rolling bearing 30.

In addition, since the pivot assembly bearing apparatus 1 is configured in which the first sleeve 40 and the second sleeve 50 include the first inward flange portion 42 and the second inward flange portion 52, respectively, the deformation of the first sleeve 40 and the second sleeve 50 to be caused by the deformation of the spacer 60 can be further prevented. Accordingly, the pivot assembly bearing apparatus 1 can further prevent the deformation of the first rolling bearing 20 and the second rolling bearing 30.

Next, a test for measuring the quantity of particles generated due to a lubricant in the pivot assembly bearing apparatus 1 will be described. A lubricant was filled in the first rolling bearing 20 and the second rolling bearing 30. The pivot assembly bearing apparatus 1 was operated in a closed space to measure the quantity of particles (the number of particles) generated due to the lubricant to be scattered from the first rolling bearing 20 and the second rolling bearing 30, for 24 hours using an airborne particle counter (KC-22A manufactured by RION Co., Ltd.). The pivot assembly bearing apparatus of the comparative example described above was used as a pivot assembly bearing apparatus of a comparative example.

As a result of the measurement test, the total count number of particles indicating the quantity of particles generated in 24 hours in the pivot assembly bearing apparatus 1 was 66% lower than the total count number of particles indicating the quantity of particles generated in 24 hours in the pivot assembly bearing apparatus of the comparative example. Further, when such a result is converted based on a volume, the volume of the quantity of particles generated in the pivot assembly bearing apparatus 1 was 56% lower than the volume of the quantity of particles generated in the pivot assembly bearing apparatus of the comparative example.

From the above description, it is understood that the quantity of particles generated in the pivot assembly bearing apparatus 1 is lower than quantity of particles generated in the pivot assembly bearing apparatus of the comparative example. The pivot assembly bearing apparatus 1 is configured in which the gap between the first outer ring 21 of the first rolling bearing 20 and the first inner ring 22 is covered by the first inward flange portion 41 of the first sleeve 40 and the gap between the second outer ring 31 of the second rolling bearing 30 and the second inner ring 32 is covered by the second inward flange portion 52 of the second sleeve 50. Therefore, the pivot assembly bearing apparatus 1 can prevent the generation of particles due to the lubricant to be scatted from the first rolling bearing 20 and the second rolling bearing 30.

In this way, the pivot assembly bearing apparatus 1 according to the embodiment of the present disclosure is configured in which the part of the first sleeve 40 protruding downwards in the axial direction from the first outer ring 21 is bonded to the spacer 60 and the part of the second sleeve 50 protruding upwards in the axial direction from the second outer ring 31 is bonded to the spacer 60. The spacer 60 is fixed into the head actuator 103 by the set screw 106. Since the pivot assembly bearing apparatus 1 is configured in which the first sleeve 40, the second sleeve 50, and the spacer 60 are separately formed, it is possible to prevent the deformation of the spacer 60 due to the set screw 106 from being transmitted to the first sleeve 40 and the second sleeve 50. Accordingly, it is possible to prevent the deformation of the first rolling bearing 20 and the second rolling bearing 30 due to the deformation of the first sleeve 40 and the second sleeve 50 and can further improve the responsiveness of the head actuator 103.

In addition, the pivot assembly bearing apparatus 1 is configured in which the first sleeve 40 includes the first inward flange portion 42 that extends from the upper end portion to the inner periphery side to cover the gap between the first outer ring 21 and the first inner ring 22 and the second sleeve 50 includes the second inward flange portion 52 that extends from the lower end portion to the inner periphery side to cover the gap between the second outer ring 31 and the second inner ring 32. Therefore, the pivot assembly bearing apparatus 1 can prevent the deformation of the spacer 60 due to the set screw 106 from being transmitted to the first sleeve 40 and the second sleeve 50. Accordingly, the deformation of the first sleeve 40 and the second sleeve 50 can be further prevented. Further, the pivot assembly bearing apparatus 1 using such a configuration can prevent the generation of particles due to the lubricant to be scattered from the first rolling bearing 20 and the second rolling bearing 30, and a hard disk drive apparatus having higher cleanliness can be obtained.

In addition, the pivot assembly bearing apparatus 1 is configured in which the spacer 60 includes the first step portion 62 recessed downwards in the axial direction from the upper end surface and the second step portion 63 recessed upwards in the axial direction from the lower end surface, the first sleeve 40 is bonded to the first step portion 62 of the spacer 60, and the second sleeve 50 is bonded to the second step portion 63 of the spacer 60. Therefore, according to the pivot assembly bearing apparatus 1, it is possible to prevent the deformation of the spacer 60 due to the set screw 106 from being transmitted to the first sleeve 40 and the second sleeve 50 by securing the thickness of the spacer 60 while saving the space between the first sleeve 40 and the spacer 60 and the space between the second sleeve 50 and the spacer 60. Accordingly, the deformation of the first sleeve 40 and the second sleeve 50 can be further prevented.

In addition, the pivot assembly bearing apparatus 1 is configured in which the spacer 60 may be formed of stainless steel having a higher hardness than the first sleeve 40 and the second sleeve 50. Thus, according to the pivot assembly bearing apparatus 1, the deformation of the spacer 60 can be further prevented.

Although an embodiment of the present disclosure has been described above, the present disclosure is not limited to the above embodiment and includes all aspects included in the concept of the present disclosure and the scope of the claims. In addition, the respective configurations may be appropriately and selectively combined so as to obtain at least a part of the effects described above. For example, the shapes, materials, arrangements, and sizes of the respective components in the above embodiment can be appropriately changed depending on the specific use mode of the present disclosure.

For example, the case is described in the embodiment of the present disclosure as an example in which the first sleeve 40 and the second sleeve 50 include the first inward flange portion 42 and the second inward flange portion 52, respectively, in the pivot assembly bearing apparatus 1 according to the embodiment of the present disclosure. However, the present disclosure is not limited to such a case, and the first inward flange portion 42 and the second inward flange portion 52 may not be provided, for example.

In addition, the case is described in the embodiment of the present disclosure as an example in which the first sleeve 40, the second sleeve 50, and the spacer 60 are separately formed in the pivot assembly bearing apparatus 1 according to the embodiment of the present disclosure. However, the present disclosure is not limited to such a case, and only one of the first sleeve 40 and the second sleeve 50 may be formed separately from the spacer 60.

What is claimed is:

1. A pivot assembly bearing apparatus to be fixed to a head actuator by a set screw, the pivot assembly bearing apparatus comprising:
   a shaft extending in an axial direction;
   a first rolling bearing provided on an upper side that is one side in the axial direction of the shaft and including a first outer ring, a first inner ring disposed on an inner periphery side of the first outer ring, and a first rolling element disposed between the first outer ring and the first inner ring;
   a second rolling bearing provided separately from the first rolling bearing on a lower side that is another side in the axial direction of the shaft and including a second outer ring, a second inner ring disposed on an inner periphery side of the second outer ring, and a second rolling element disposed between the second outer ring and the second inner ring;
   a first sleeve bonded to an outer peripheral surface of the first outer ring;
   a second sleeve bonded to an outer peripheral surface of the second outer ring; and
   a spacer abutting on a lower end surface of the first outer ring and an upper end surface of the second outer ring, wherein
   a part of the first sleeve protruding downwards in the axial direction from the first outer ring is bonded to the spacer, and a part of the second sleeve protruding upwards in the axial direction from the second outer ring is bonded to the spacer, wherein
   the first sleeve includes a first inward flange portion extending toward an inner periphery side to cover a gap between the first outer ring and the first inner ring, and
   the second sleeve includes a second inward flange portion extending toward an inner periphery side to cover a gap between the second outer ring and the second inner ring.

2. The pivot assembly bearing apparatus according to claim 1, wherein
   the spacer includes a first step portion recessed downwards in the axial direction from an upper end surface of the spacer and a second step portion recessed upwards in the axial direction from a lower end surface of the spacer, and
   the first sleeve is bonded to the first step portion of the spacer, and the second sleeve is bonded to the second step portion of the spacer.

3. The pivot assembly bearing apparatus according to claim 1, wherein
   the spacer is formed of stainless steel having a higher hardness than the first sleeve and the second sleeve.

4. A head actuator comprising:
   the pivot assembly bearing apparatus according to claim 1; and
   a set screw, wherein
   the set screw presses the spacer to fix the pivot assembly bearing apparatus.

5. A hard disk drive apparatus comprising:
   the head actuator according to claim 4.

6. A pivot assembly bearing apparatus to be fixed to a head actuator by a set screw, the pivot assembly bearing apparatus comprising:
   a shaft extending in an axial direction;
   a first rolling bearing provided on an upper side that is one side in the axial direction of the shaft and including a first outer ring, a first inner ring disposed on an inner periphery side of the first outer ring, and a first rolling element disposed between the first outer ring and the first inner ring;
   a second rolling bearing provided separately from the first rolling bearing on a lower side that is another side in the axial direction of the shaft and including a second outer ring, a second inner ring disposed on an inner periphery side of the second outer ring, and a second rolling element disposed between the second outer ring and the second inner ring;
   a first sleeve bonded to an outer peripheral surface of the first outer ring;
   a second sleeve bonded to an outer peripheral surface of the second outer ring; and
   a spacer abutting on a lower end surface of the first outer ring and an upper end surface of the second outer ring, wherein
   a part of the first sleeve protruding downwards in the axial direction from the first outer ring is bonded to the spacer, and a part of the second sleeve protruding upwards in the axial direction from the second outer ring is bonded to the spacer, wherein
   the spacer includes a first step portion recessed downwards in the axial direction from an upper end surface of the spacer and a second step portion recessed upwards in the axial direction from a lower end surface of the spacer, and
   the first sleeve is bonded to the first step portion of the spacer, and the second sleeve is bonded to the second step portion of the spacer.

7. The pivot assembly bearing apparatus according to claim 6, wherein the spacer is formed of stainless steel having a higher hardness than the first sleeve and the second sleeve.

8. A head actuator comprising:
   the pivot assembly bearing apparatus according to claim 6; and
   a set screw, wherein
   the set screw presses the spacer to fix the pivot assembly bearing apparatus.

9. A hard disk drive apparatus comprising:
   the head actuator according to claim 8.

* * * * *